US006224526B1

(12) United States Patent
Stimmelmayr et al.

(10) Patent No.: US 6,224,526 B1
(45) Date of Patent: May 1, 2001

(54) PRINTING ROLLERS

(75) Inventors: Horst Stimmelmayr; Kai Horeis, both of Wels (AT)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 0 days.

(21) Appl. No.: 08/994,638

(22) Filed: Dec. 19, 1997

(51) Int. Cl.[7] .......... B23P 15/00

(52) U.S. Cl. .......... 492/56; 492/59

(58) Field of Search .......... 492/56, 59

(56) References Cited

U.S. PATENT DOCUMENTS

| | | | | |
|---|---|---|---|---|
| 2,886,774 | | 5/1959 | Probus . | |
| 3,002,866 | * | 10/1961 | Gartrell et al. | 492/59 |
| 3,245,941 | | 4/1966 | Mayer et al. . | |
| 3,248,454 | | 4/1966 | Muller et al. . | |
| 3,446,771 | | 5/1969 | Matsubayashi et al. . | |
| 4,324,177 | * | 4/1982 | Tsuji et al. | 492/56 |
| 5,334,690 | | 8/1994 | Schafheutle et al. . | |
| 5,434,653 | * | 7/1995 | Takizawa et al. | 355/259 |
| 5,445,886 | | 8/1995 | Ogawa . | |
| 5,470,515 | | 11/1995 | Grimm et al. . | |
| 5,541,001 | * | 7/1996 | Vreeland et al. | 492/56 |
| 5,679,463 | * | 10/1997 | Visser et al. | 492/56 |
| 5,733,235 | * | 3/1998 | Waku et al. | 492/56 |
| 5,761,581 | * | 6/1998 | Nojima | 492/56 |
| 5,782,730 | * | 7/1998 | Kawasaki et al. | 492/56 |
| 5,797,322 | * | 8/1998 | Lorig et al. | 492/56 |
| 5,803,887 | * | 9/1998 | Fukunaga | 428/447 |
| 5,895,689 | * | 4/1999 | Gajewski | 492/56 |

FOREIGN PATENT DOCUMENTS

| | | |
|---|---|---|
| 195 29 809 A1 | 8/1995 | (DE) . |
| 0 566 418 A2 | 4/1993 | (EP) . |
| 3473782 | 8/1977 | (RU) . |

* cited by examiner

*Primary Examiner*—I. Cuda
(74) *Attorney, Agent, or Firm*—Nancy N. Quan

(57) ABSTRACT

Printing rollers and sleeves for printing rollers can be provided with a high quality top coat composition which can improve various properties such as solvent resistance, cut resistance, and thermal stability (with respect to dimensional stability and hardness stability), and reduce manufacturing time and costs. A polyurethane top coat composition is used with filler present in an amount of from about 15–70% by weight of the coating. The coatings may also include a low density, high hardness foam underlayer which can be applied without a molding operation.

5 Claims, No Drawings

PRINTING ROLLERS

BACKGROUND OF THE INVENTION

1. Field of the Invention

The present invention relates to rollers and sleeves for rollers which are used in printing processes. The invention more particularly relates to coatings and compositions for coatings which may be used on rollers and sleeves on apparatus which prints ink onto receptor materials. The coatings may display a range of properties including, but not limited to, thermal stability, durable hardness, grindability, and flexibility.

2. Background of the Art

The process of providing images on substrates by printing actually involves a wide variety of different types of processes. The technology has advanced substantially from the type-set and carved substrate lithographic printing of the $16^{th}$ through $19^{th}$ century to include such varied processes as gravure printing, relief printing, flexographic printing, lithographic printing, photolithographic printing, offset printing, and numerous other processes which are included within the broad terminology of printing. Even processes that do not use imaged substrates with differential images (in relief or in ink affinity) to transfer images are mischaracterized as printing processes. Such misnamed processes would include laser jet printing, bubble jet printing, and even some forms of electrostatic printing (where there is no transfer of a toned electrostatically developed image).

The traditional printing process involves the formation of an image on a substrate, the image having the capability of accepting ink thereon in an imagewise distribution which will allow the ink to be transferred in the form of an image to a receptor surface. The capability of accepting ink in a differential form may be effected by a relief image on a surface, a differentially hydrophilic/hydrophobic image area, or the like.

In the actual printing process, it is common to use rollers, usually cylindrical elements, in many different phases of the process. The rollers may be used, for example, to support a printing plate or receptor material, transfer a printing plate or receptor material, carry ink, transfer ink, press the printing plate or inking pad, press the printing plate into contact with a receptor material, remove excess materials (e.g., inks, fountain solutions or coatings), develop the image, or dry the printed image. Rollers can directly affect the quality of the printed image because of their potential direct involvement in the position of materials, contact with the printed image and receptor materials, transfer of ink to the printing surface, and forces directly involved in the printing step. Defects in rollers, such as surface irregularities, concavity and convexity can cause build-up of materials on the surface of the roller. Such defects can easily be seen to cause reduction in printing quality where the rollers transfer erroneous amounts of ink and/or differentially apply pressure to the printing plate when the plate is transferring ink during the printing process. It is therefore necessary that the rollers provide a uniform and durable surface, and it is desirable that these types of surfaces be provided at minimal cost.

The surfaces of rollers can provide the desired surface characteristics by either mechanical milling of the roller surface, coating of the roller surface, or application of a sleeve to the roller surface. Sleeves, as the name implies, are placed over the rollers in a tight fit and may even be shrunk over the roller to provide an exceptionally tight fit. The use of sleeves allows for the use of roller substrates of various materials and allows the rollers to be adapted to different printing processes by altering the composition and structure of the sleeve. A sleeve is different from a coating. Coatings are usually applied as liquids or laminable film to a roller surface. As the applied surfaces (coatings and sleeves) wear down over time, the sleeves offer one type of advantage in their being able to be replaced without chemical treatment or grinding of the roller.

Many conventional rollers used in the flexographic printing industry are prepared from fiber reinforced (e.g., glass fiber) polymers, especially polyester resin. The rollers can be manufactured by building up layers of fiberglass and resin on a support (e.g., of the shape and dimensions desired), and then solidifying the reinforced resin mix. The thickness may be built up by additional layering if desired, and a top coat of polyester resin may be applied to the surface. This top coat may be machined or ground to the diameter desired. The top coat may be applied by spraying and curing.

DE 195529809 A describes a high heat conductivity coating for printing rollers which comprises an elastomeric resin with up to 50% by weight of filler. The resin material may be heat-vulcanized rubber, nitrile-butadiene rubber, phenolic, epoxy, polyurethane, polyester, silicone, acrylic or acrylate resin systems, and the filler may be carbon black and/or silanized silica to improve the heat conductivity. The coating thickness is usually below 100 micrometers, especially between 5 and 40 micrometers, the applied coating is usually thermally post-treated. The coating compositions may be applied from a solution or dispersion, especially by spraying.

EPO 566 418 A describes an electrically conductive or semiconductive polymeric material comprising a metal salt dissolved in a polymer. The metal salt is complexed with the polymer to provide a material with a resistivity of $10^{12}$ to $10^{5}$ ohms/cm. The material comprises less than 5% by weight of the metal salt, which is usually a transition metal halide, although copper lactate, copper larate, iron phosphate and iron oxalate are described. The metal salts are described as having molecular sizes of 1–10 Angstroms. The polymers in which the metal salts are included are elastomeric polymers and rubbers such as nitrites, natural rubbers, neoprene, fluorocarbons and silicones. The coating compositions are disclosed as useful on rollers, including pick-up rollers on paper printers.

U.S. Pat. No. 5,445,886 describes a printing roller consisting of a metal core with a surface layer with a lattice-fabricated groove structure on the surface of the roller. The surface of the roller is coated with elastomeric materials of polyurethane resin, silicon rubber, acrylates, epoxy resin, phenolic resin, nitrile rubber, fluororubber and nitrile rubber.

Soviet Union Patent Application SU 3473782 describes a copper-containing dimer isocyanate oligomer of the formula $Cu_3(C_6H_3CH_3(NCO)_2)_6Cl_6$, obtained by the reaction of cupric chloride with 2,4-toluene diisocyanate in acetone or tetrahydrofuran. A multi-nuclear complex is formed which provides a novel antistatic polyurethane for use in the manufacture of antistatic coatings, camera winding rollers and print rollers.

SUMMARY OF THE INVENTION

The invention describes a printing roller for use in the printing industry comprising:

a) a cylindrical substrate;

b) a foam base coat having a low degree of compressibility; and c) a top coat comprising polyurethane resins having from about 15% to about 70% by weight of solid particles (including microspheres) dispersed therein.

This compressibility property of the foam base layer is less than about 2%, preferably less than about 1.5%, and most preferably less than about 1% or less than about 0.5% under the normal range of operating pressures identified for use with the particular printing machinery, particularly with the mid-range of pressures useful for that particular printing press.

The foam base coat preferably has a Shore D hardness of at least about 25 at room temperature and this Shore D is preferably reduced by no more than about 35% at 80° C. The top coat preferably has a Shore D hardness of at least about 50 at room temperature and similarly is preferably reduced by no more than about 35% at 80° C.

The polyurethane resin can comprise the reaction product of a polyol and a polyisocyanate, especially where the polyurethane is crosslinked. The cylindrical substrate can be hard, but flexible.

The foam base coat can comprise a 2-component polyurethane comprising:

a) component A comprising:
   i) from about 20% to about 80% by weight of at least one polyol having OH-values of about 100 to about 400 and a OH-functionality of at least about 2.3;
   ii) about 1% to about 20% by weight of at least one low molecular weight crosslinking agent having isocyanate reactive groups;
   iii) about 0.1% to about 1.5% by weight of water; and
b) component B comprising a liquid isocyanate hardener having a functionality of at least 2.

The mixing ratios of component A to component B of the foam base coat preferably ranges from about 0.81/1 to about 1.2/1. Optionally, up to about 50% by weight of at least one filler may be included.

The printing roller may also comprise:

a) a cylindrical substrate; and
b) a top coat comprising polyurethane resins having from about 15% to about 70% by weight of solid particles (including microspheres) dispersed therein, again where the polyurethane resin is crosslinked.

The present invention further describes a roller comprising:

a) a cylindrical substrate; and
b) a foam base coat having a low degree of compressibility.

A top coat can be coated over the foam base coat, the nature of the top coat depends on the use.

If used as a printer roller, the top coat can be any coating adapted for any printing process, including laser printing. The roller can also be used for other applications such as extrusion, calendaring, etc. If used in extrusion and calendaring, the top coat can be adapted to possess release properties, scratch resistance, etc.

The polyurethane resins have resistance to solvents used in the application of inks, fountains, washing fluids and the like used with printing presses and plates, and have a coefficient of thermal expansion of less than about $2\times10^{-4}\%/°C$.

The invention further describes a process for providing and applying a surface coating composition to the surface of printing rollers. The process for manufacturing a printing roller can comprise the steps of providing a substrate for said roller, applying a first liquid coating composition to said roller which is capable of forming a compressible layer, forming a compressible layer from said first liquid coating composition, applying a second liquid coating composition to said compressible layer, said second liquid coating composition comprising a combination of polyol and polyisocyanate and insoluble particles in a weight range of from about 15% to about 70% of solids in said second liquid coating composition, and reacting said polyol and polyisocyanate to form a non-foamed polyurethane coating.

The coating composition is formed from what may be generally described as a two component polyurethane system comprising a first component system of a) a polyol, optional crosslinker, inorganic filler, optional additives, and optional molecular sieve, and b) a liquid isocyanate hardener, preferably with an isocyanate functionality greater than 2.

The coating composition may be applied directly to the surface of the cylindrical substrate or inner tube, or if different physical properties are desired in the roller product, an underlayer (between the surface of the cylindrical substrate and the coating) can be present. This underlayer could be a flexible elastomer, preferably a cellular elastomer, to compensate for different properties of the inner tube and the coating composition. Also an elastomer, and preferably a non-cellular polyurethane elastomer, may be used. It is preferred that the non-cellular elastomer be relatively hard so that it may even be ground prior to application of the top coating.

DETAILED DESCRIPTION OF THE INVENTION

Printing rollers are critical to the performance of printing apparatus and processes. Even with the highest quality printing plates and imaging systems, the use of poorly performing rollers which support the plates (especially flexographic printing plates), apply fluid, or press the receptor substrate into contact with the plate can reduce the quality of the printed image. It is also desirable to provide rollers with moderate weight and density to facilitate their ability to perform properly on presses. The rollers are strong, durable, hard, but of controlled flexibility, and have uniform surfaces. The rollers of the present invention perform consistently and durably under printing conditions so that the press does not have to be shut down frequently for changes of components. The rollers also perform similarly under variations in conditions, especially temperature, without adversely changing dimensions. For example, the rollers display a thermal coefficient of expansion (for the entire roller) of less than about $2\times10^{-4}/°C.$, preferably less than about $1\times10^{-4}/°C.$, more preferably less than about $5\times10^{-5}/°C.$ Coating compositions for printing rollers and rollers having these compositions thereon comprise a cylindrical support element for the roller and at least one coating composition. The at least one coating composition comprises a polyurethane resin which provides low thermal expansion, solvent resistance, thermally stable hardness, and durable hardness.

Polyurethane compositions are the preferred materials of choice for the manufacture of layers of the present invention, both for the non-cellular elastomeric coating and the top coating for the rollers of the present invention.

Processes for the production of polyurethane polymers and prepolymers are conventionally and preferably performed by reacting an excess of polyisocyanates with organic compounds having two or more hydroxyl groups in the presence of a catalyst which promotes the reaction and yields a polyurethane polymer product or a prepolymer product which may be further reacted (e.g., with water or polyols) to form a hydrolytically stable cellular or non-cellular polyurethane or poly-(urethane-urea).

The generic class of polyisocyanate materials used in the practice of this invention are well-known in the art and can be represented by the formula $R(NCO)_n$, where R is an organic radical such as aryl, alkyl, cycloalkyl, combinations thereof, etc., and n is 2 to 5.

Preferred organic polyisocyanates of use in the practice of this invention are the aromatic polyisocyanates ordinarily used in urethane chemistry such as the moderately hindered arylene diisocyanates as, for example, the toluene diisocyanate isomers. However, unhindered diisocyanates such as 4,4-biphenylene diisocyanates and 4,4'-methylene-bis (phenylisocyanate) and strongly sterically hindered diisocyanates such as 3,3'-dimethoxy-4,4'-biphenylene diisocyanate and durene diisocyanate are also useful in the practice of this invention. Triisocyanates such as triphenylmethane triisocyanate and higher polyisocyanates can also be used as, for example, the reaction product of an excess of toluene diisocyanate with trimethylol propane. The larger the number of isocyanate groups on the polyisocyanate, the more strongly crosslinked will be the product. Mixtures of polyisocyanates are often used to control the degree of crosslinking and tailor the physical properties of the polyurethane for the ultimate intended use of the polymer. Aliphatic polyisocyanates can also be used. The preferred polyisocyanates to be used are aromatic polyisocyanates because the prepolymers made therefrom generally react faster with water when foams are desired and sufficient water is used. One of the most useful polyisocyanate compounds which can be used for this purpose is toluene diisocyanate, particularly as a blend of 80 weight percent of toluene-2,4-diisocyanate, and 20 weight percent of toluene-2,6-diisocyanate. A 65:35 blend of the 2,4- and 2,6-isomers is also useful. These polyisocyanates are commercially available under the trademark Hylene™, Nacconate™ 80, and Mondur™ TD-80. Other useful polyisocyanate compounds which can be used are other isomers of tolylene diisocyanate, hexamethylene-1,6-diisocyanate, diphenylmethane-4,4¢-diisocyanate, m- or p-phenylene diisocyanate, narborane diisocyanate and 1,5-naphthalene diisocyanate. Polymeric polyisocyanates can also be used, such as polymethylene polyphenyl polyisocyanates, such as those sold under the trademarks Mondur™ MRS and PAPI™. A list of useful commercially available polyisocyanates is found in "Encyclopedia of Chemical Technology," by Kirk and Othmer, 2d ed., vol. 12, pp. 46–47, Interscience Pub. (1967).

NCO-capped prepolymers can also be used with catalysts to produce urethane-modified polyisocyanurates. Such prepolymers can also be used in admixture with polyols and the mixture catalyzed to produce products with urethane and isocyanurate linkages. Such NCO-capped prepolymers are well-known (see U.S. Pat. Nos. 3,073,802 and 3,054,755) and are generally prepared by reacting an excess of polyisocyanates, such as an aromatic diisocyanate with polyalkylene ether glycols, or polyester glycols. Prepolymers are sold under the trademarks Multrathane and Adriprene. The isocyanate can also be used in the form of a blocked isocyanate.

The polyols to be reacted with polyisocyanates are preferably those in which the carbon bearing the —OH group also bears at least one H atom. These primary or secondary alcohols tend to form more stable reaction products than do tertiary alcohols.

Suitable organic polyhydroxy compounds for reaction with the organic polyisocyanates include simple aliphatic polyols such as ethylene glycol, 1,2-propylene glycol, 1,3-butylene glycol, 2,3-butylene glycol, tetramethylene glycol, pentamethylene glycol, hexamethylene glycol, decamethylene glycol, 2,2-dimethyltrimethylene glycol, glycerine. Trimethylolethane, timethylolpropane, pentaerythritol, sorbitol, 1,6-hexanediol, 1,2,6-hexanetriol, 2-ethyl-1,3-hexanediol, castor oil, polyvinyl alcohol and partially hydrolyzed polyvinyl acetate; carbohydrates containing 5 to 8 hydroxyl groups such as sucrose, dextrose, and methylglucoside, ether polyols such as diethylene glycol and dipropylene glycol; aromatic polyols such as diphenylene glycol; and mixtures thereof are also useful.

Suitable higher molecular weight organic polyhydroxy compounds are the polyether polyols (or polyoxyalkylene polyols) prepared by reaction of any of the above polyols with an alkylene oxide such as ethylene oxide, 1,2-propylene oxide, 1,3-propylene oxide, epichlorohydrin, epibromohydrin, 1 ,2-butene oxide and tetrahydrofuran. These polyether polyols are described in U.S. Pat. No. 2,886,774 and include polyethylene glycol and polytetramethylene ether glycol. Additionally, anionic polyols can be used and such polyols and their preparation are further described in U.S. Pat. No. 5,334,690, incorporated herein by reference. These polymeric polyols will have average molecular weights of from 200 to 8000, preferably 400 to 2000. Preferably, these polymeric polyols will be diols or triols.

An additional class of high molecular weight polyhydroxy compounds for use in accordance with this invention are the polyester polyols prepared by reaction of more than one, but not more than two, hydroxy equivalent weights of any of the above polyols with one equivalent weight of a polycarboxylic acid such as diglycolic, succinic, glutaric, adipic, suberic, azelaic, sebacic, phthalic, isophthalic, terephthalic, chlorendic and pyromellitic acids. Other high molecular weight polyhydroxy compounds include hydroxy-alkyl acrylate and methacrylate monomers and polymers, including copolymers with aromatic compounds containing an ethylenically unsaturated side chain such as those described in U.S. Pat. No. 3,245,941.

Generally, the polyol-polyisocyanate reaction mixtures cured with the catalyst of this invention can have

NCO/OH equivalent ratios in the range of 0.8/1 to 1.2/1, preferably at least 0.9/1 to 1.1/1 since below the latter the product will contain unreacted or free hydroxyl groups (which have a plasticizing function) and will be a more flexible product.

The hardness and elasticity of the polyurethane can be controlled within relatively close limits by control of the amount of crosslinking. A cross-linked elastomer is created by the inclusion of trifunctional or higher polyfunctional components into the reaction mixture in predetermined amounts, or by building such further functionality into the isocyanate or the polyol reactants of the system to provide a functionality greater than two. Thus, a small amount of a triol or other polyol such as 1,2,6-hexanetriol, pentaerythritol, trimethylol propane, glycerol, or polymeric compounds having more than two hydroxyls per molecule may be used. In addition to or in place of a polyol, the polyfunctional component can be a small amount of a triisocyanate or a polyisocyanate of greater functionality, such as that provided by the reaction of toluene diisocyanate with trimethylol propane as mentioned above or with any of the aforementioned polyols. Usually, from about 1% to about 10% of the trifunctional component is used depending on the hardness desired and the molecular weight of the crosslinking component used: generally, the lower the equivalent weight and the greater the amount of the crosslinking component used, the harder is the polyurethane obtained. The present invention contemplates the use of high percentages of polyfunctional polyols with more than two hydroxyl groups per molecule, with a high degree of crosslinking resulting.

The foam suppressing action of acid compounds, either separate acids or acids as part of the catalyst system is effective in suppressing the formation of foam in polymerizing urethane compositions containing 0.5 weight percent or more water when the catalyst system contains about 3 weight percent acid compound based on the total weight of urethane composition. The use of more than about 5 weight percent acid compound may be employed. However, with increasing amounts of acid compound, there is an increasing plasticization of the polyurethane obtained.

Filled polymer products can be made by incorporating into the reaction mixtures a host of different powdered or finely divided fillers (e.g., 0 to 50 weight percent by weight of the foam and 15 to 70% by weight of the top coat layer) such as clay, talc, metal oxides, metal silicates, metal carbonates, metal sulfates, semimetal counterparts of the oxides, silicates, sulfates and carbonates, inorganic oxides, carbon black, graphite, metals, titanium dioxide, diatomaceous earth, etc. Glass or ceramic or metallic spheroids or microbubbles are useful in making lightweight isocyanurate-modified polyurethane syntactic foamed articles which can be finished by sanding. Co-reactant materials such as the diamines described in U.S. Pat. No. 3,248,454 and amides such as disclosed in U.S. Pat. No. 3,446,771 can be included in the polyol-polyisocyanate reaction mixture, e.g., to increase the viscosity or moldability thereof as well as to increase the hardness of the resulting product. However, the polyisocyanate and polyol reactants are the sole essential reactants to be used in this invention. Fire retardant fillers, such as polyvinyl chloride and antimony or phosphorous compounds can also be incorporated into the reaction mixture.

Shore D hardness may be determined by standard and reported test methods similar to ASTM Procedure D 2240-68 and is a measure of the surface characteristics of the polyurethane product of this invention.

Good hydrolytic stability may also be provided to the urethane products of this invention so that they can be shaped in the form of articles that are subject to moisture contact during use or which come into contact with aqueous solvents or water, such as gaskets, seals, etc.

The underlying cylindrical substrate may be manufactured by any convenient process, from any convenient materials, including the above described layered glass fiber reinforced polyester materials and processes, with or without a top coat. The foamable composition may be applied to the underlying roller structure by any convenient process, specifically, the liquid reactants for the foam layer are applied to the substrate when the substrate is rotating. The foamable composition (preferably a polyurethane foamable material) is then reacted to produce the foam. The reaction is preferably carried out without the need for the confinement of a mold, but molding operation for shaping of the foam layer can also be used in the practice of the present invention. The shape and dimensions of the foamed layer on the roller can be accurately controlled without a mold by the appropriate volumetric and thickness application of the liquid reactants to a rotating roller support, and the density of the foam layer can be controlled by the selection of reactants, temperatures and degree of crosslinking. By restricting the extent to which the foam expands, a higher density and more durable foam underlayer can be produced. The density of the foam can also be controlled by selection and compounding of the formulation. The foam generally has a density between about 0.2 and 0.7g/$cm^3$, preferably has a density between about 0.25 and 0.65 g/$cm^3$, and more preferably between about 0.3 and 0.5 g/$cm^3$. The Shore D hardness of the foam as noted above is at least about 20 at room temperature, preferably at least about 25 or 30 at room temperature, and more preferably at least about 40 or 45 at room temperature. It is desirable that the Shore D hardness be reduced no more than about 35%, preferably no more than about 25%, and most preferably no more than about 15% or about 10% at 80° C. than the Shore D hardness at room temperature. After completion of the foamable layer (if it is used in the roller construction), the reactive composition for the top coat layer is applied (e.g., by the various coating procedures described above while the foam coated roller is rotating). That composition is hardened on the surface of the foam layer and the roller is essentially complete. The thickness of the foam layer may vary, and is dependent upon the particular end use of the roller, the particular type of printing process with which it is used, and the particular desires of the printer. Some specific users desire a sleeve or coating thickness up to 70 mm or more. The foam layer is usually within the range of 5 to 40 mm and preferably from 5 to 30 mm. It is also desirable that the polyol used in the foam layer is characterized by an OH-value preferably of between about 100 and about 400, more preferably between about 225 and about 400 with a functionality (OH functionality) of greater than about 2.3, preferably greater than about 2.4 and more preferably greater than about 2.5. The OH-values and OH-functionalities are chosen to produce a foam layer having Shore D hardness described Supra. At lower OH-functionalities, e.g., less than 2.3, the foam layer produced generally has a Shore D hardness that changes by more than 35% between room temperature and elevated temperatures. This greater variation in Shore D hardness is less desirable because the rollers will become softer at elevated temperatures during printing cycles, thus generating variations in print qualities. It is also preferred that the A-component contains crosslinker with a molecular weight less than about 750, preferably less than about 600 and most preferably less than about 500, such as triethanolamine, 3-methylopropane, pentaerythritol, and the like (with the same or similar polyols preferred for the top coat layer).

Fillers can also be added to the foam layer. The preferred fillers are selected from carbonates, silicates, sulfates and oxides of metals (also including the alkali metal, transition metals, and even rare earth metals) and semimetals (e.g., aluminum, gallium, etc.), such as calcium carbonate, calcium silicates, barium sulfate, titanium oxide, iron oxides, tin oxides, and aluminum oxide (with the same filler preferred for the non-foam layer also). The size of the particles is not critical, but will generally be provided in sizes which can easily be dispersed within the reactive composition without excessive agglomeration. For example, particles of from about 0.1 to 100 microns can be used, but the lowest size range would tend to agglomerate more easily. The larger particles can be inconvenient to thin layers. The preferred range would therefore be from about 0.5 to 50 microns, more preferably from about 0.7 to 25 microns. The functionality of the polyisocyanate should also preferably be higher than 2, more preferably be higher than about 2.5, most preferably about 2.7.

It is surprising that the foam layer has low density, high Shore D hardness and yet retains flexibility. It is even more surprising that the Shore D of the foam layer shows good resistance to solvents such as acetone, etc, and does not change very much with temperature making it especially useful for printing applications. It is surmised that the combination of a high OH-value and high functionality of at least one of the polyol components gives rise to this combination of properties.

It is desirable that the top coat has good resistance to solvents such as acetone or ethylacetate and other common solvents in the printing industry, without swelling, as the rollers come into contact with many solvents, such as those in font solutions, fountains, wash solution, inking solutions, cleaning solutions, and the like. It is also desirable that the top coat be hard and abrasion resistant, but sufficiently flexible to achieve resistance against chipping, impact and cutting and provide latitude in compressive support of a plate against the printing receptive substrate. This resistance against cutting is important because flexographic printing plates are often removed from the roller by cutting with a knife, which can often damage the underlying roller. Cuts or nicks in the top coat also create an uneven surface which would be detrimental to the printing process. The roller, after application of the top coat, can provide a constant printing pressure and maintain a precise and constant printing diameter. The roller also allows for grinding to effect the precise diameter, yet be resistant to melting at the temperatures and heat generated by grinding. The melted top coat could also clog the grinding element if it melted at these temperatures and conditions. The coating and/or sleeve do not significantly change dimensions with temperature changes, thus the coating has a low degree of thermal expansion. The coating displays at most moderate if any changes in hardness with variations in temperature (e.g., especially up to 100° C.). These temperature changes could be encountered during transport or use. The coatings are resistant to lowering of hardness from elevated temperatures (e.g., up to 100° C.). Susceptibility to such hardness changes with temperature variations could easily and adversely affect the performance and characteristics of the rollers. The top coat displays a low coefficient of thermal expansion, such as for example with the top coat expanding less than about 1%, preferably less than about 0.5% and most preferably less than about 0.3% with a temperature change of 50° C. It is also possible to reduce the thermal expansion of the top coat by the addition of the particulates into that coating layer.

Similar to the foam layer, the OH-values of polyol of the composition for the top coat preferably varies between about 100 and about 400, more preferably between about 225 and about 400, with a functionality (OH-functionality) of preferably greater than about 2.3, more preferably greater than about 2.4 and most preferably greater than about 2.5. The OH-values and OH-functionalities are also chosen to produce a top coat having Shore D hardness described below, similar to their effect on the Shore D hardness of the foam layer.

Some of these properties can be more quantitatively defined. The density of the top coat, for example, varies between about 1.15 and about 1.65 or about 1.2 and about 1.6 g/cm$^3$, preferably between about 1.3 and about 1.6 g/cm$^3$. The Shore D hardness at room temperature is at least about 40, preferably at least about 50 or at least about 60, and more preferably at least about 70 or at least about 80. It is desirable that the Shore D hardness be reduced no more than about 35%, preferably no more than about 25%, and most preferably no more than about 15% or about 10% at 80° C. than the Shore D hardness at room temperature (e.g., 20° C.). For example, the top coat can display a low decrease in Shore D hardness with elevated temperatures (e.g., with a Shore D hardness of 83±5 at 20° C., and a Shore D hardness at 80° C. of 72±5).

It is especially desirable to use microspheres, e.g., glass or ceramic or inorganic oxide, to reduce the thermal sensitivity, the thermal conductivity, increase the solvent resistance, and increase the hardness of the top coat layer. Any particle which can tolerate the pressures normally undertaken in printing processes (especially the most pressures of flexographic printing) which are insoluble in the polyurethane can be used in the practice of the present invention. Inorganic oxides, especially ceramics, glasses and metal oxides are particularly useful in the practice of the present invention. Graphite and metals could also be useful in the practice of the present invention. Carbon black is not desirable as the sole particulate additive, but may be blended (preferably in minor portions, e.g., less then about 30%, less than about 20, number average) into the composition. The particles should be smaller than a number average particle effective diameter of about 100 micrometers, preferably less than about 75 micrometers, still more preferably less than about 50 or about 25 microns, still more preferably less than about 10 or less than about 5 microns, and most preferably less than about 2, less than about 1 and less than about 0.5 micrometers. The particles are helpful in controlling the thermal expansion properties of the top coat layer. The benefits are initially provided at levels beginning with about 15% by weight of particles (by eight of the total weight of the coating), with benefits increasing with increasing amounts. It is preferred to have larger weight percentages of particles, with amounts of at least about 20% or about 25% by weight up to about 70% by weight preferred, and with about at least about 30, at least about 40, or at least about 50% by weight up to about 70% by weight being more preferred in many constructions.

Some of the advantages of the materials and constructions of the present invention include the following:

1) Increased capability of automated processing because of the ability of the foam and the coating layer to be applied automatically and shaped or not shaped in a mold. The reduction in the time of manufacture (even with the added cure times) has been as much as 50% or more.

2) The cylindrical substrates can be mass produced with one dimension, and the present invention allows the foam layer and top coating thickness to be varied to generate printing rollers of varying dimensions.

3) There are environmental aspects of improvements, with traditional materials often requiring the use of volatile materials, including ethylenically unsaturated co-reactants such as styrene.

4) The reduced density of the base layer allows for thicker rollers and sleeves, with wall (or coating) thicknesses of even 70 mm being easily handled.

5) The foam layer and the top coat layer are compatible with each other (e.g., the hardness and thermal expansion coefficients). The two layers interact to increase resistance to damage from impact.

6) The rollers and coating are resistant to damage from elevated temperatures, at least in part because of the low thermal expansion coefficients. There is also little drop in Shore D hardness when the rollers are subjected to elevated temperatures. (e.g., up to 80° C.).

7) The compositions of the coatings tend to be resistant to the specific solvents that tend to be used within the printing industry (e.g., acetone, ethyl acetate), and are resistant to cutting.

8) The coatings are more easily applied to larger length rollers so that there are not as many restrictions on the available sizes of rollers. Grinding to smoothness of large dimension rollers was costly and inefficient. The present process increases the ease for providing the quality needed in larger size rollers.

9) The top coat is also more easily and successfully ground than many previous top coats.

The inner tubes may still be made by hand, however, mass production is now possible to produce large quantities of same dimension tubes as mentioned above. The top coat can be done by automated processes as well. It is no longer a sprayed reactive polyester resin layer, which as noted above can emit harmful vapors such as styrene.

As discussed before, the foam layer or top coat can be either coated directly on the surfaces of these inner tubes, or the surfaces are first coated with an underlayer such as a cellular elastomer to compensate for the different properties of the inner tubes and the foam or top coat composition. Sometimes a non-cellular polyurethane elastomer can be used.

General formulations of the foam layer can be represented below:

| A-Component: | |
|---|---|
| 20–80% | Polyol (especially with OH-value: 100–400 and functionality > 2.5) |
| 0–20% | Crosslinker (molecules with low molecular weight and isocyanates reactive groups: i.e., triethanolamine, pentaerythritol) |
| 0–1.5% | Deionized water |
| 0–50% | Filler (any kind of known fillers used in PU systems, i.e., calcium carbonate, silicates, barium sulfate, aluminum oxides) |
| 0–20% | additives (i.e., pigments, catalysts, rheological additives, surfactants, UV-stabilizer) |

B-Component:

Liquid isocyanate hardener (i.e., based on MDI, TDI, IPDI, HDI, especially with a functionality more than 2)

Mixing ratios of A to B can vary in the range of 0.8/1 to 1.2/1 of the stochiometric ratio.

General formulations of the top coat can be represented below:

| A-Component: | |
|---|---|
| 20–80% | Polyol (especially with OH-value: 100–400 and functionality > 2.3; especially Polyesterpolyol) |
| 0–20% | Crosslinker (moleculaes with low molecular weight and isocyanates reactive groups: i.e., triethanolamine, pentaerythritol) |
| 2–10% | Molecular sieve (3A or 4A) |
| 15–65% | Filler (any kind of known fillers used in PU systems, i.e., calcium carbonate, silicates, barium sulfate, aluminum oxides) |
| 0–20% | Additives (i.e., pigments, catalysts, rheological additives, surfactants, UV-stabilizer) |

B-Component:

Liquid isocyanate hardener (i.e., based on MDI, TDI, IPDI, HDI, especially with a functionality more than 2).

Mixing ratios of A to B can vary in the range of 0.8/1 to 7.2/1 of the stochiometric ratio.

In general, the manufacturing of the printer roller of the present invention can be any known process, specifically, "application on the rotating body" process is preferred.

For base layer material and top layer material the same hardener is used. The equipment we recommend is a 3c-dosing machine. Two A components (one for the base layer and the other for the top coat) and a common hardener.

The inner tube made of FRP (Fiber Reinforced Plastics= the above described construction of the inner tube made of glass fiber plus polyester resin) rotates with ca. 60 rpm (depends on the circumference of the inner tube and the layer thickness which should be applied).

The foamable base layer is applied with the 3c-Dosing machine. The nozzle moves parallel to the axis of the inner tube. The coordinated rotating of the tube with the movement of the nozzle along the axis generates a complete layer of polyurethane material on the tube. Immediately after application the foaming starts and within minutes the material has reached its final layer-thickness and the surface is tack free. The layer thickness is in a range of 10–20 mm. The density of the foam is about 0.3–0.5 g/$cm^3$.

Depending on the requirements, further base layers could be applied to a maximum over all base layer thickness of about 70 mm. The limit is the mechanical stability of the sleeve. After the last base layer application, the top coat is applied. The machine switch to the A-component of the top coat and the procedure is the same as described above. The viscosity of the base layer and the top coat must be low enough to get a smooth surface, but high enough to avoid a run off. The curing of both materials occurs within minutes. The grinding of the surface is recommended after 12 hours.

An actual formulation of materials useful in the practice of the present invention includes, for example, a two component set of reactants for the individual layers as follows:

EXAMPLE 1

Foam Base Coat

| A components: | |
|---|---|
| 12.00% | Baycoll ™ BT 1380 (a polyetherpolyol; OH-value 380; functionality, 3); |
| 54.20% | Bester ™ SL 732 (a polyesterpolyol, OH-value 320; functionality, 3); |
| 5.0% | triethanolamine (crosslinker); |
| 0.10% | water dest.; |
| 20.0% | Omya ™ BL (calcium carbonate); |
| 2.00% | Eredur ™ 43 (amine, used as a reactive rheologic agent); |
| 0.30% | Dabco ™ 33LV (amine based catalyst); |
| 1.40% | Moltopren Blaupaste ™ (pigment) |
| 5.00% | Aerosil ™ R 202 (fumed silica acid, rheologic additive) |

| B component: | |
|---|---|
| Mixing ratio: | A component:B component was 100:70 |
| Starting Time: | 40 ± 5 sec. |
| Rising Time: | 120 ± 10 sec. |
| Tack-free Time: | 120 ± 10 sec. |

Desmodur ™ VKS 20 F (functionality 2.7; polyisocyanate)

| Properties of the Cured Product: | |
|---|---|
| Shore D hardness (Room Temperature): | 50 ± 5 |
| SHore D hardness (80° C.): | 43 ± 5 |
| Density: | 0.4 ± 0.05 g/cm$^3$. |

EXAMPLE 2

Top Coat

Top coat composition comprises a two component system of:

| A-Component: | |
|---|---|
| 39.50% | Bester ™ SL 732 (Polyesterpolyl, OH-value 320, functionality: 3) |
| 5.00% | Triethanolamine (crosslinker) |
| 4.50% | Molecular sieve |
| 45.07% | Omya ™ BL (Calcium carbonate) |
| 3.50% | Euredur ™ 43 (amine, use as a reactive rheological additives) |
| 0.03% | Dabco ™ 33LV (amine based catalyst) |
| 1.40% | Moltopren ™ Blaupaste ™ (pigment) |
| 1.00% | Kieselsäure ™ HDK N 20 (funed silica acid, rheological additive) |

| B-Component | |
|---|---|
| Mixing ratio: | A-component:B-component = 100:49 |
| Pot life: | 90 ± 10 s |

Desmodur ™ VKS 20 F (functionality 2,7)

| Properties of the cured product: | |
|---|---|
| Density: | 1.43 g/cm$^3$ |
| Shore D-hardness (RT): | 83 ± 5 |
| Shore D-hardness (80° C.) | 72 ± 5 |
| Thermal expansion coeff.: | 5 ± 1 E −5 [1/° C.] |

Each of these compositions were applied by the 3c dosing machine on the rotating body. The foamable layer (composition A) provided a reduced density polyurethane, which was a hard foam having high mechanical solidity. This material enables the end user to combine the properties of a molded polyurethane foam (low density of about 0.3 g/cm$^3$, for example, with high mechanical strength) with the advantage that the two-component polyurethane composition applied to the roller support while it was rotating to allow for automated processing without any restrictions on the length or diameter of the sleeves. No molds were necessary to produce the useful foam layer of this example, though a mold could be used if desired.

The excellent mechanical properties of the foam layer (hardness, flexibility, and high mechanical strength) allows high wall thicknesses of the foam layer, for example to 70 mm and greater. Prior to the use of the compositions of the invention, it is believed that such dimensions in wall thickness were possible with only molded foams. Typical wall thicknesses on rotating roller support bodies without the use of the compositions of the present invention have typically been about 25 mm.

The base layer (the foam layer) of this example is very compatible with the top coat layer used in the practice of the present invention. The two materials can easily display similar characteristics with respect to thermal coefficients of expansion and hardness versus temperature. The former similarity (especially when the values are within 5 or 10% of each other) allows for potential reduction in any possible layer separations between the foam layer and the top coat layer. The two layers therefore work extremely well as a system and have excellent resistance to damage from impact.

Both coatings can be used in providing a high performance roller or sleeve with the respective coating compositions applied by a rotating body application method. There is no mold necessary to give the roller or sleeve a cylindrical shape, and there is no real limitation in the length and diameter of the sleeve or roller. The materials are also tolerant of grinding, and high quality grinding can be performed thereon. This is unusual with polyurethanes, which are more thermoplastic than polyesters. Polyurethanes would previously have been expected to melt during grinding and cover the grind stone. The use of the highly crosslinked polyurethanes (functionality greater than 2.2, preferably greater than 2.4, more preferably greater than 2.5 or 2.6, still more preferably greater than 2.7, and most preferably greater than 2.8 for at least one of the isocyanate components, if not all of the isocyanate components and or polyol components) with high filling levels is a unique benefit to this field.

The following examples, further illustrating the invention, are shown in Tables I and II.

TABLE I

Influence of polyols on the Shore D hardness at higher temperaturews (Top coat)

| | Example 2 (w/o rheological additives) | Example 3 | Example 4-C | Example 5-C |
|---|---|---|---|---|
| POlyol (OH value: 319, functionality: 3) | 42.45 | 47.45 | | |
| Polyol (OH value: 225, functionality: 2.2) | | | 42.45 | |
| Polyol (OH value: 112, | | | | 42.45 |

TABLE I-continued

Influence of polyols on the Shore D hardness at higher temperaturews (Top coat)

| | Example 2 (w/o rheological additives) | Example 3 | Example 4-C | Example 5-C |
|---|---|---|---|---|
| functionality: 2) | | | | |
| Triethanolamine | 5.0 | | 5.0 | 5.0 |
| Chalk | 47.45 | 47.45 | 47.45 | 47.45 |
| Molecular Sieve | 5.0 | 5.0 | 5.0 | 5.0 |
| Catalyst | 0.1 | 0.1 | 0.1 | 0.1 |
| Mixed with identical hardener (isocyanate functionality: 2.7), the cured polyurethane has the following properties: | | | | |
| Shore D Hardness: 20° C. | 87 | 86 | 89 | 70 |
| Shore D Hardness: 80° C. | 75 | 63 | 55 | 31 |

4-C and 5-C are comparative examples.

TABLE II (Influence of polyols on the Shore D Hardness at higher temperatures)

| | Example 1-C | Example 2 | Example 3 (basis formula of the invented product) |
|---|---|---|---|
| Polyol (OH value: 319, functionality: 3) | — | — | 49.15 |
| Polyol (OH value: 112, functionality: 2) | 49.15 | — | — |
| Polyol (OH value: 380, functionality: 3) | 50.0 | 94.15 | 45.0 |
| Triethanolamin | — | 5.0 | 5.0 |
| Catalyst | 0.8 | 0.8 | 0.8 |
| Water | 0.05 | 0.05 | 0.05 |
| Mixed with identical hardener (NCO functionality: 2.7), the cured polyurethane has the following properties | | | |
| Shore D Hardness: 20° C. | 50–55 | 35–40 | 55 |
| Shore D Hardness: 80° C. | 10 | 30 | 50 |

As discussed before, the roller can also be used in applications other than printing, provided the top coat is adapted for such other uses. The excellent mechanical properties of the foam layer allows high wall thickness leading to production of low density, large diameter rollers.

What we claim:

1. A printing roller comprising:

a) a cylindrical substrate;

b) a foam base coat having a degree of compressibility of less than about 2% on press during printing, said foam base coat is interposed between said cylindrical substrate and a top coat, and c) a top coat comprising a 2-component polyurethane resin having from about 15% to about 70% by weight of solid particles dispersed therein and a Shore D hardness of at least about 40 at room temperature, wherein said 2-component polyurethane comprises:

a) component A comprising:

I) from about 20% to about 80% by weight of at least one polyol;

ii) about 1% to about 20% by weight of at least one low molecular weight crosslinking agent having isocyanate reactive groups;

iii) about 0.1% to about 1.5% by weight of water; and iv) up to about 50% by weight of at least one filler; and b) component B comprising a liquid isocyanate hardener having a functionality of at least 2;

wherein the mixing ratio of said component A to said component B ranges from about 0.8/1 to about 1.2/1.

2. The roller of claim 1 wherein said at least one polyol has OH-values of about 100 to about 400 and an OH-functionality of at least about 2.3.

3. The roller of claim 2 wherein said at least one polyol has an OH-value of about 225 to about 400.

4. A printing roller comprising:

a) a cylindrical substrate;

b) a foam base coat having a degree of compressibility of less than about 2% on press during printing, said foam base coat is interposed between said cylindrical substrate and a top coat, and c) a top coat comprising a polyurethane resin having from about 15% to about 70% by weight of solid particles dispersed therein and a Shore D hardness of at least about 40 at room temperature, wherein said polyurethane comprises:

a) component A comprising:

i) from about 20% to about 80% by weight of at least one polyol;

ii) about 1% to about 20% by weight of at least one low molecular weight crosslinking agent having isocyanate reactive groups;

iii) about 0.1% to about 1.5% by weight of water; and iv) up to about 50% by weight of at least one filler; and b) component B comprising a liquid isocyanate hardener having a functionality of at least 2;

wherein the mixing ratio of said component A to said component B ranges from about 0.8/1 to about 1.2/1.

5. The printing roller of claim 4 in printing contact with a flexographic printing plate.

* * * * *